United States Patent [19]
Sapienza

[11] Patent Number: 5,596,174
[45] Date of Patent: Jan. 21, 1997

[54] EXPANDABLE ELECTRICAL OUTLET BOX

[76] Inventor: Joseph Sapienza, 188 Siegfreid, Williamsville, N.Y. 14221

[21] Appl. No.: 323,440

[22] Filed: Oct. 4, 1994

[51] Int. Cl.$^6$ ............................................. H01R 13/502
[52] U.S. Cl. ............................. 174/57; 174/53; 220/3.7
[58] Field of Search ....................... 174/57, 53; 220/3.7

[56] References Cited

U.S. PATENT DOCUMENTS

| 740,663 | 10/1903 | Krantz | 220/3.7 |
|---|---|---|---|
| 1,672,683 | 6/1928 | Knoderer | 220/3.7 X |
| 2,044,860 | 6/1936 | Silverman | 220/3.7 |
| 2,369,728 | 2/1945 | Farkas | 220/8 X |
| 3,573,344 | 4/1971 | Snyder | 174/57 |
| 3,622,029 | 11/1971 | Ware | 174/57 X |
| 4,304,957 | 12/1981 | Slater et al. | 174/58 X |
| 5,042,673 | 8/1991 | McShane | 220/3.7 |

Primary Examiner—Kristine L. Kincaid
Assistant Examiner—Dean A. Reichard
Attorney, Agent, or Firm—James J. Ralabate

[57] ABSTRACT

This invention provides an expandable electrical outlet box that fits into the same size wall opening as a removed to be replaced box. The present box, being expandable, provides about double the capacity as a smaller non-expandable box. Thus, more conductors can be provided in the present box using the same space opening as the box being replaced. One section of the box is slidably or movably positioned in a main section of the box, both sections having openings for installing electrical wiring.

7 Claims, 3 Drawing Sheets

EXPANDABLE ELECTRICAL OUTLET BOX

This invention relates to electrical outlet boxes and, more particularly, to an expandable outlet box.

BACKGROUND OF THE INVENTION

There are known several improvements in outlet boxes but generally a standard type box is used in most installations. Various improvements in electrical boxes are noted in the reference patents cited in U.S. Pat. No. 4,304,957.

In U.S. Pat. No. 4,304,957 (Slater et al) an electrical outlet box is disclosed having recessed wall areas that house panel mounting devices and electrical power cable entry ports. The cable entry ports of Slater have self-opening and self clamping closure panels extending angularly inward from the rim of the port which are also self-centering and self-adjusting for different cable sizes. In Slater as in all other type outlet boxes there are a maximum number of conductors permitted as per the National Electrical Code, NFPA 70. The National Fire Protection Association (NFPA) has released together with the National Electrical Code (NFPA70-1993) standards on the number conductors permitted to be used with specific size boxes.

In Article 370 of the National Electrical Code, a table 370-16(a) was presented indicating the maximum number of conductors for each size outlet box. This table is as follows:

| Box Dimension, Inches Trade Size or Type | Min. Cu. In. Cap. | Maximum Number of Conductors | | | | | |
|---|---|---|---|---|---|---|---|
| | | No. 18 | No. 16 | No. 14 | No. 12 | No. 10 | No. 8 | No. 6 |
| 4 × 1¼ Round or Octagonal | 12.5 | 8 | 7 | 6 | 5 | 5 | 4 | 2 |
| 4 × 1½ Round or Octagonal | 15.5 | 10 | 8 | 7 | 6 | 6 | 5 | 3 |
| 4 × 2⅛ Round or Octagonal | 21.5 | 14 | 12 | 10 | 9 | 8 | 7 | 4 |
| 4 × 1¼ Square | 18.0 | 12 | 10 | 9 | 8 | 7 | 6 | 3 |
| 4 × 1½ Square | 21.0 | 14 | 12 | 10 | 9 | 8 | 7 | 4 |
| 4 × 2⅛ Square | 30.3 | 20 | 17 | 15 | 13 | 12 | 10 | 6 |
| 4¹¹⁄₁₆ × 1¼ Square | 25.5 | 17 | 14 | 12 | 11 | 10 | 8 | 5 |
| 4¹¹⁄₁₆ × 1½ Square | 29.5 | 19 | 16 | 14 | 13 | 11 | 9 | 5 |
| 4¹¹⁄₁₆ × 2⅛ Square | 42.0 | 28 | 24 | 21 | 18 | 16 | 14 | 8 |
| 3 × 2 × 1½ Device | 7.5 | 5 | 4 | 3 | 3 | 3 | 2 | 1 |
| 3 × 2 × 2 Device | 10.0 | 6 | 5 | 5 | 4 | 4 | 3 | 2 |
| 3 × 2 × 2¼ Device | 10.5 | 7 | 6 | 5 | 4 | 4 | 3 | 2 |
| 3 × 2 × 2½ Device | 12.5 | 8 | 7 | 6 | 5 | 5 | 4 | 2 |
| 3 × 2 × 2¾ Device | 14.0 | 9 | 8 | 7 | 6 | 5 | 4 | 2 |
| 3 × 2 × 3½ Device | 18.0 | 12 | 10 | 9 | 8 | 7 | 6 | 3 |
| 4 × 2⅛ × 1½ Device | 10.3 | 6 | 5 | 5 | 4 | 4 | 3 | 2 |
| 4 × 2⅛ × 1⅞ Device | 13.0 | 8 | 7 | 6 | 5 | 5 | 4 | 2 |
| 4 × 2⅛ × 2⅛ Device | 14.5 | 9 | 8 | 7 | 6 | 5 | 4 | 2 |
| 3¾ × 2 × 2½ Masonry Box/Gang | 14.0 | 9 | 8 | 7 | 6 | 5 | 4 | 2 |
| 3¾ × 2 × 3½ Masonry Box/Gang | 21.0 | 14 | 12 | 10 | 9 | 8 | 7 | 4 |
| FS-Minimum Internal Depth 1¾ Single Cover/Gang | 13.5 | 9 | 7 | 6 | 6 | 5 | 4 | 2 |
| FD-Minimum Internal Depth 2⅜ Single Cover/Gang | 18.0 | 12 | 10 | 9 | 8 | 7 | 6 | 3 |
| FS-Minimum Internal Depth 1¾ Multiple Cover/Gang | 18.0 | 12 | 10 | 9 | 8 | 7 | 6 | 3 |
| FD-Minimum Internal Depth 2⅜ Multiple Cover/Gang | 24.0 | 16 | 13 | 12 | 10 | 9 | 8 | 4 |

For SI units: one cubic inch = 16.4 cm$^3$.

A number of older homes have interior walls that are studded sideways and in order to install a replacement outlet box in the wall one cuts a hole bigger than the replaceable box. When it is desired to use more conductors than previously used in the old box, a larger box must be installed. The large hole is then patched up after the installation of the new box. The normally used process, for example, when replacing a 2"×3" box with a 4"×4"×1½" box is to cut the dry wall then mount a 4"×4"×1½" metal or plastic outlet box, then patch up the drywall or plaster opening. In some situations a larger outlet box cannot be installed because of the studs or other obstacles in the wall. If, for example, there are blocking pipes or sideway studdings installation of a box larger than the previously installed box poses several problems. While these obstructions can be relocated or removed, this would amount to substantial reconstruction and generally is not attempted. Therefore, there is a need for means to replace an old, smaller outlet box with a larger box that will permit a greater number of conductors to be placed therein.

SUMMARY OF THE INVENTION

It is therefore an object of this invention to provide a replacement outlet box devoid of the above noted disadvantages.

Another object of this invention is to provide a larger replacement electrical outlet box that can be used in the same wall space used for the previously installed smaller box, A further object of this invention is to provide means for increasing the number of permitted conductors while using the same wall aperture used for the replaced box.

Still a further object of this invention is to provide an expandable, electrical outlet box that is easy to use, relatively inexpensive and very space efficient.

A yet further object of this invention is to provide for increased conductor capacity without having to damage the wall by cutting out a larger aperture for a larger capacity box.

Yet another object of this invention is to provide a larger replacement box that eliminates damage to the walls because of the desired increased capacity.

Yet still a further object of this invention is to provide a replacement electrical box that doubles the capacity (more conductors) of the previously installed box while occupying the same space.

These and other objects are accomplished in accordance with this invention by an expandable electrical outlet box that will fit in a wall opening resulting from removal of a smaller capacity box. Not only can more conductors be used with the present box than permitted in the replaced smaller box, but also conductors of greater capacity can be used; for example, in a 3"×2"×2" box, the allowable conductor capacity is a #14 wire. A #12 wire is not permitted to be used in this size box. With the present invention, because the expandable box doubles the size of the box, increased conductor capacity is allowed. As clearly indicated in the above table, a 3"×2"×2" box is permitted a maximum of 5#14 conductors. By using the expandable box of this invention, i.e. 4"×4"×1½" square box, a maximum of 10 #14 conductors can be used, double the amount of a normal 3"×2"×2" box. The allowed capacity of the old 3"×2"×2" electrical box is 10.0 cu. in. capacity, whereas the expanded box of this invention which fits in the same opening as the 3"×2"×2" has an allowed capacity of 21.0 cu. in., more than double the old box.

To replace a 3"×2"×2" old electrical box, you would remove the old box leaving an opening of 3"×2" remaining. The desired number of wires would be inserted into the expandable section of the box of this invention, close the outlet box so that it will fit in the opening, insert the box in the 3"×2" opening and then expand the box out. This doubles the capacity of the outlet box when expanded allowing for more conductors. Corner fasteners on the box allow the box to be fastened to the dry wall without mounting to a stud. The box of this invention comprises a two piece box, the first piece being the main housing section and the second piece being the expandable section. The expandable section is slidably positioned in the first main section and just slightly smaller in dimensions, in effect almost the same size as the main section. If it was desired to increase the capacity of the old box, the box of this invention is deposited in the old opening and expanded out to almost double its' size. A box, for example, that had only 2 wires connected thereto could not be used for 4 wires or conductors. The box of this invention can expand sideways, to the right or to the left, up or down. The box of this invention can be made of metal plastic or any other suitable material. The box of this invention in one instance will measure unexpanded 2½"×3" whereas when expanded would measure 4"×3".

DETAILED DESCRIPTION OF DRAWINGS AND PREFERRED EMBODIMENTS

Figure 1:
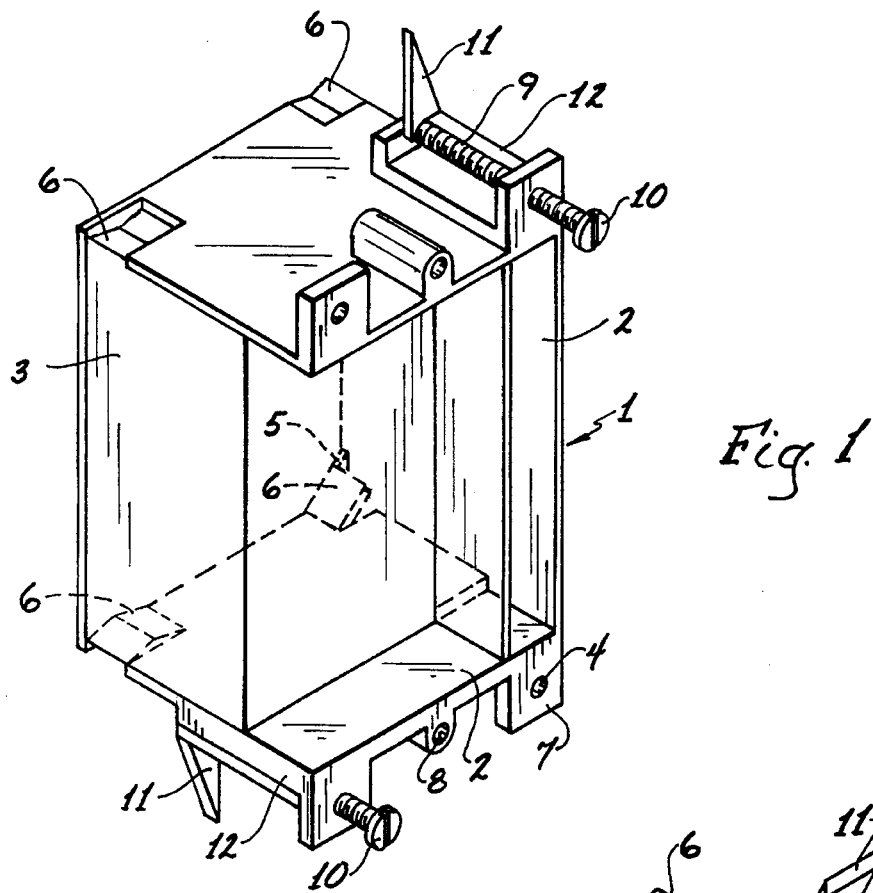
FIG. 1 is a perspective side view of the expandable outlet box of this invention in its non-extended or non-expanded mode.

In FIG. 1, the electrical outlet box 1 of this invention comprises two compartments or sections, an outer or two sided main section 2 and an inner or expandable section 3. Three sided expandable section 3 is slidably positioned in main section 2 and will easily slide outwardly from main section 2 on tracks (shown in FIG. 2). Wire openings 8 are provided on the outer corners of main section 2 and expandable section 3 to allow or receive the wires to be attached to each section. Screw holes 4 are provided to attach outlet box 1 to the interior of the wall. A gussett ramp 5 is provided to open a flexible hinged door 23. Drywall stops 7 are provided to hold box 1 to a wall, each stop 7 has an aperture to receive a threaded screw or other securing means. Screw holes 8 are positioned to be used when attaching electrical outlet means to the box 1. Threaded molly bolt type screws 9 are used to tighten to box 1 and clamp it to the drywall. As tightening means 10 are turned clamp 11 moves forward and clamps box 1 to a drywall or plaster wall. A screw guide 12 is used to stabilize and direct screw 9 as it is turned to tightened clamp 11 to a wall. The hingeable cover tab 13 is used to cover wire openings or hole in main box 2 after expansion. To load expandable section 3 the wires to be used are inserted into wire openings 6 to be connected to any means in the interior of section 3. The box 1 is then inserted into an opening in a wall and section 3 slid outwardly away from main section 2 thereby almost doubling the area to be used as an outlet box. Section 2 is then wired appropriately and a switch plate connected thereto via screw holes 8.

Figure 2:
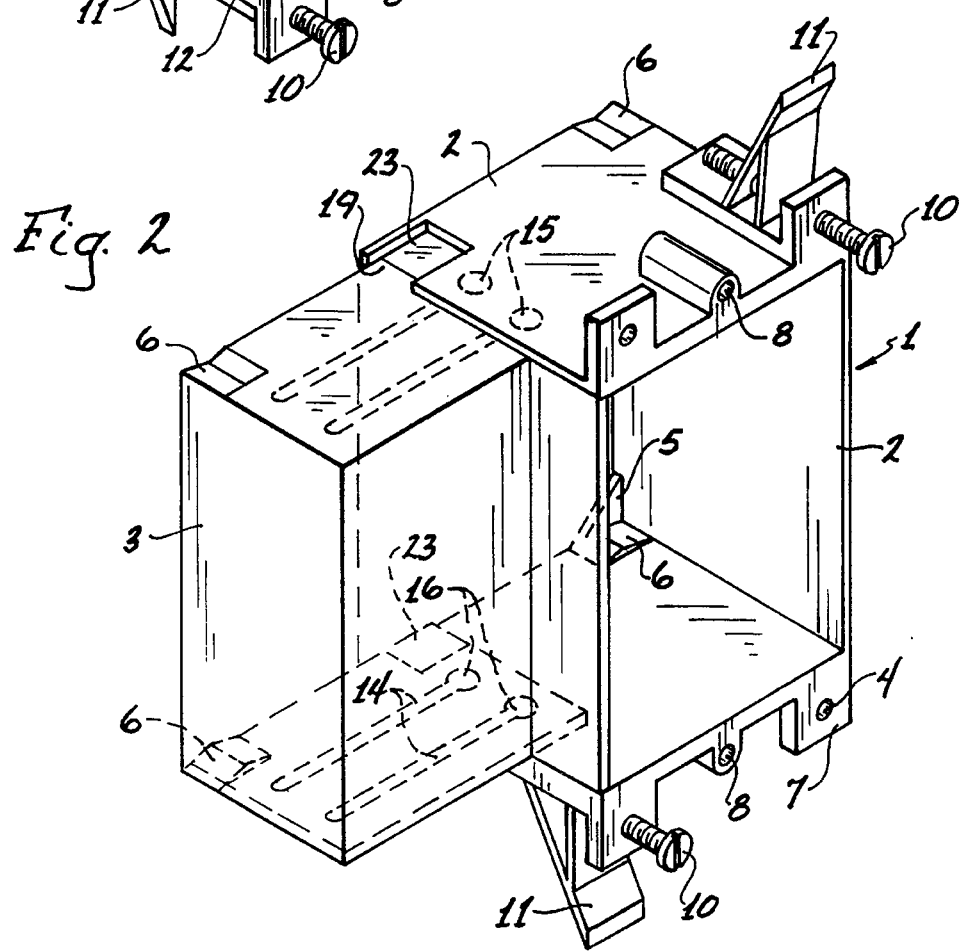
FIG. 2 is a perspective side view of the expandable outlet box of this invention in its extended or expanded mode.

In FIG. 2, expandable section 3 is moved out from main section 2 to thereby substantially double the capacity of the outlet box 1. Section 3 moves along tracks 14 until the desired extension is reached, then protruding stops or nipples 15 engage apertures 16 (see FIG. 5) to hold sections 2 and 3 stationary and in place. Molly bolt type clamp 11 shown in FIG. 2 is different from that of FIG. 1; however, any suitable type clamp 11 may be used to tighten the box 1 against a dry wall or other type wall structure. Cut out section 19 is to permit wires to be inserted in the box.

Figure 3:
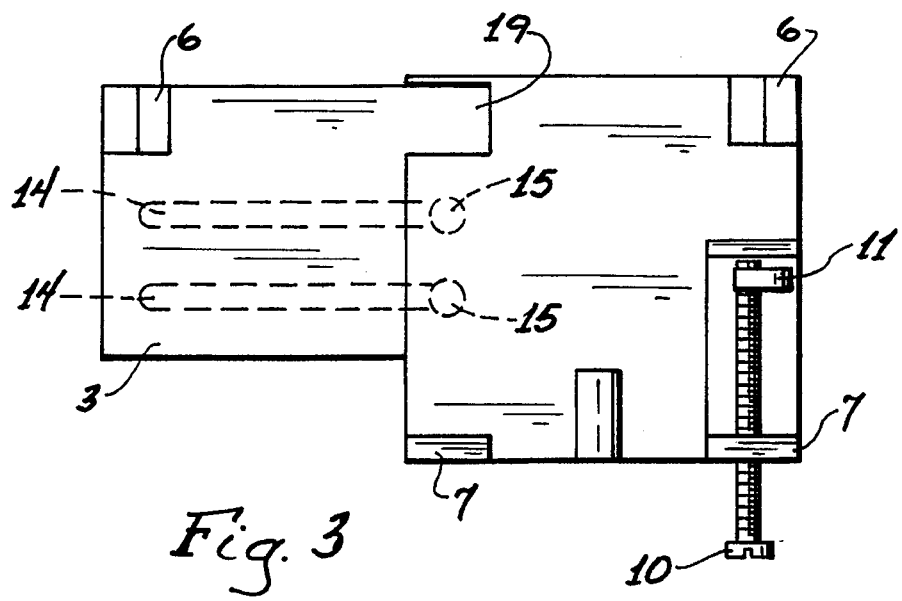
FIG. 3 is a top plan view of the expandable outlet box of this invention in its extended or expanded mode.

In FIG. 3, a top plan view of the outlet box 1 of the present invention is shown. Main box section 2 has slightly larger dimensions than section 3. Unexpanded box 1 has dimensions in one embodiment of 2¼"×2⅛"×1½"; when expanded its dimensions become 4"×2⅛"×1 ½". The hingeable cover tabs 13 cover the holes or apertures 6 in the main box or section 2 after box 1 is expanded. A cut out portion or opening 19 is provided to allow box 1 to be closed Without wire interference. Flexible hinged door 23 is used to close box without wire interference. Flexible hinged door 23 is located at top and bottom of box 3.

Figure 4:
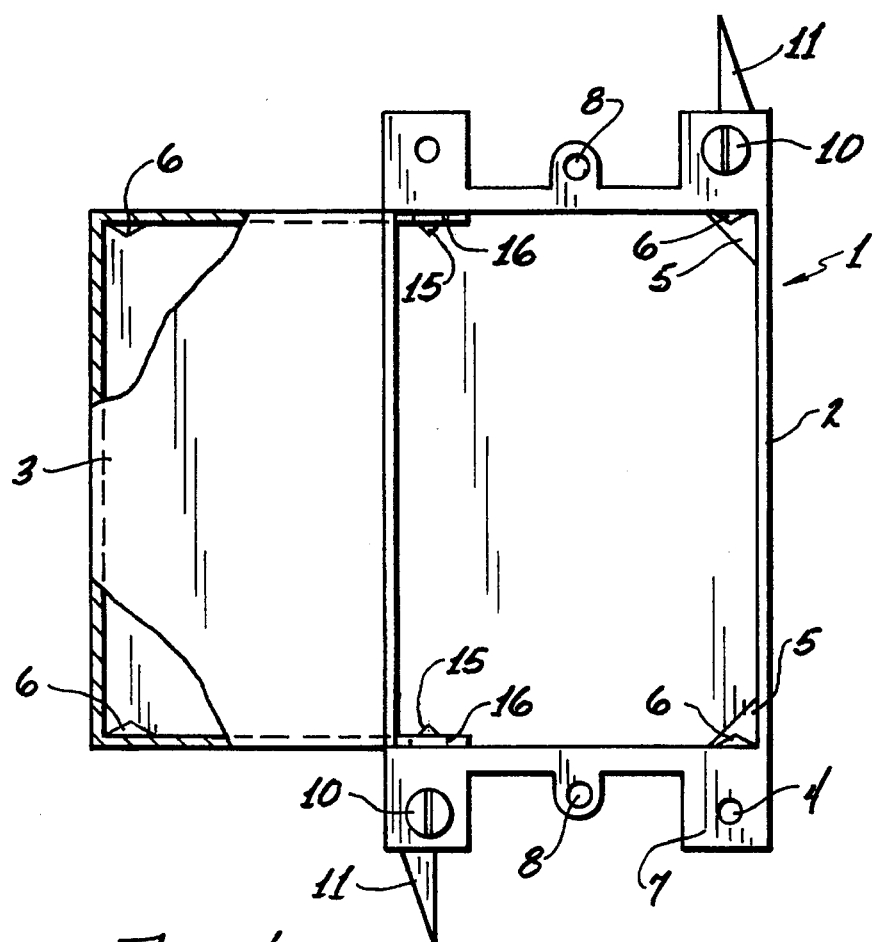
FIG. 4 is a front plan view of the expandable outlet box of this invention in its extended or expanded mode.

FIG. 4 is a front plan view of box 1 in its expanded mode. Expandable section 3 has substantially the same dimensions as section 2 except section 3 is not as deep as section 2 as shown in FIGS. 1, 2 and 3. Wire openings 6 are provided in each of the outside corners of sections 2 and 3. Screw holes 8 are provided for attaching plugs or other electrical outlet connections to box 1. Drywall stops 7 are used to hold box 1 to a wall.

Figure 5:
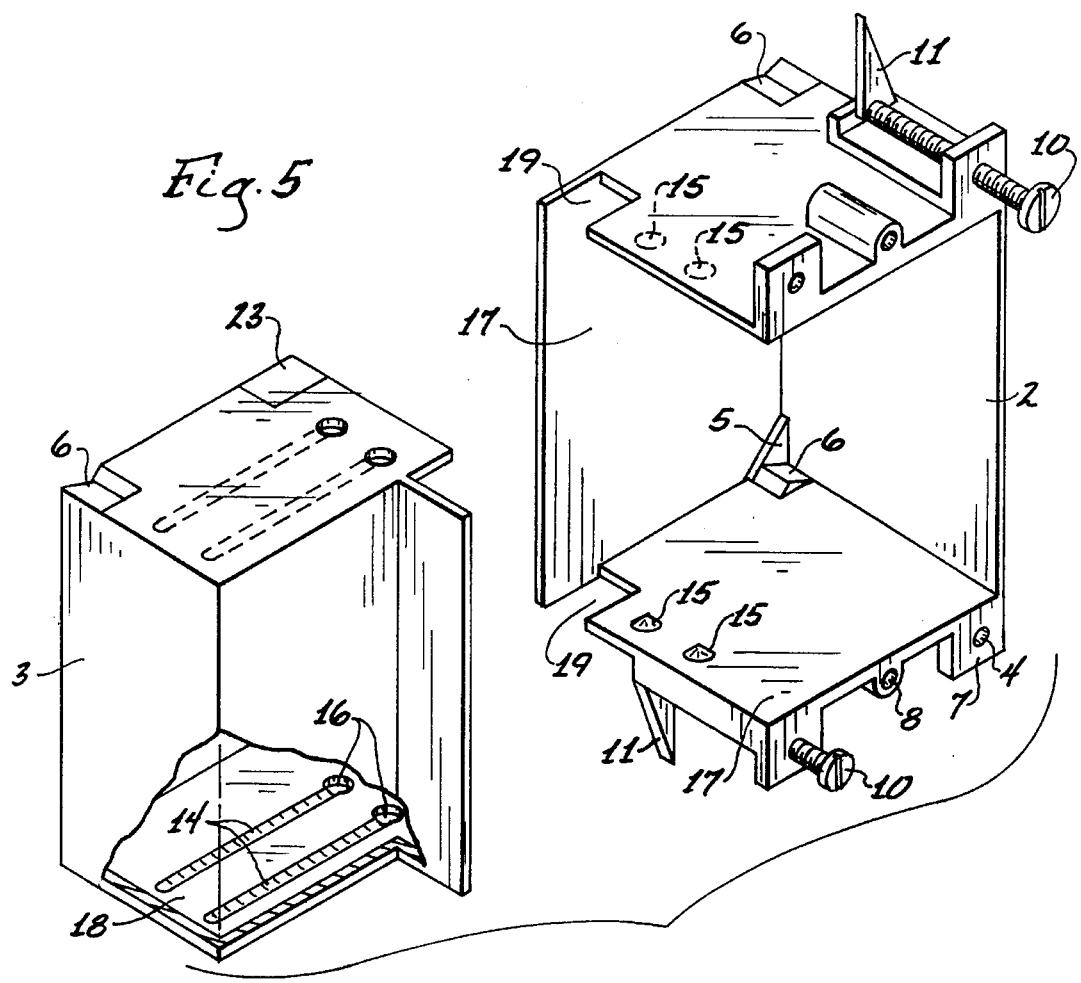
FIG. 5 is a perspective side view of the expandable outlet box of this invention in a disassembled or dismantled mode.

FIG. 5 shows the box 1 as sections 2 and 3 are separated or dismantled. The tracks 14 in section 3 are clearly illustrated as are apertures 16 at the inner terminal portions of tracks 14. The protruding stops 15 located in the inner portions 17 (top and bottom) of section 2 engage the apertures 16 located in the inner portions 18 of section 3. When the stops 15 are forced into apertures 16, sections 2 and 3 are locked in position. Hinged door 23 is shown at the top right corner of section 3.

Figure 6:
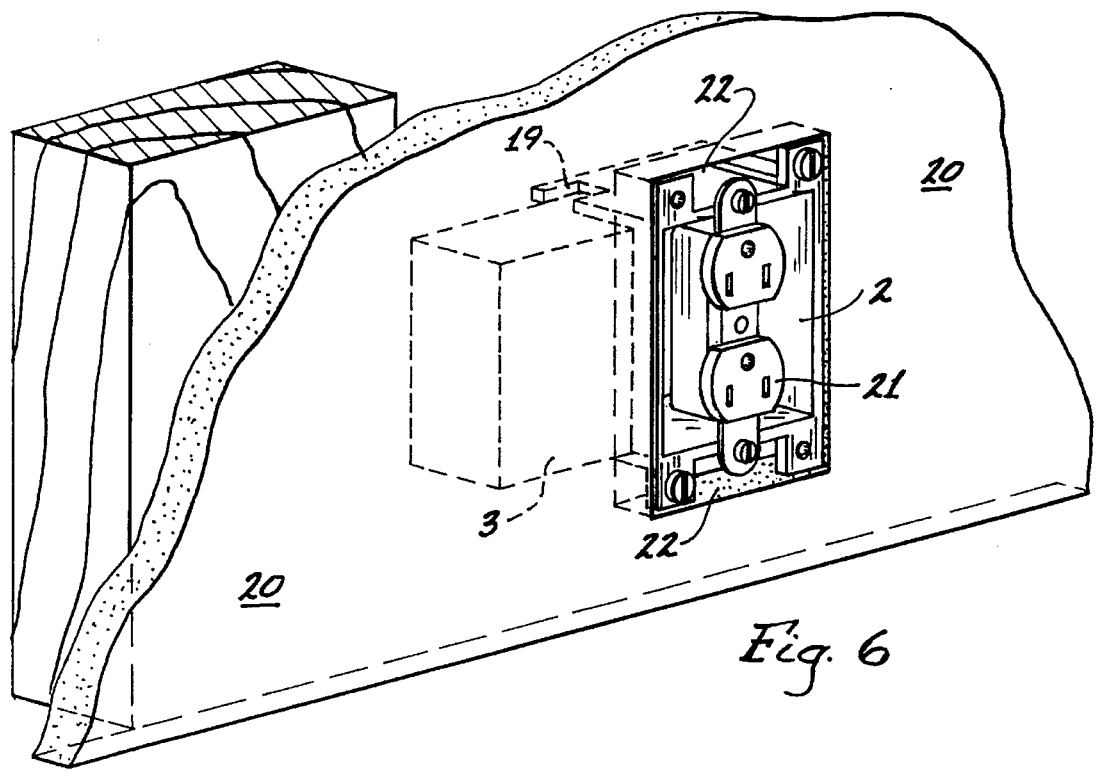
FIG. 6 is a perspective view of the expandable outlet box of this invention as it is installed into an old opening in a wall.

FIG. 6 shows box 1 installed into a wall 20 in its expanded mode. Plugs 21 or other electrical outlet connections are attached to box 1 via screw holes 8. In its expanded mode, box 1 now provides double the capacity of a single outlet box which would fit in the same wall opening 22. Section 3 is now inside wall 20 with electrical connections that give increased capacity using the same opening 22 for installation.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. An expandable electrical outlet box comprising a main compartment, a movable expandable compartment, wall connecting means and wire insertion means, said wire insertion means in each of said main and expandable compartments, said expandable compartment movably fitting into said main compartment and when in a closed mode providing a space between said main and said expandable compartments for a user to easily move said expandable compartment into and out from said main compartment, said main compartment comprising a top section and a bottom section, said movable expandable compartment also comprising a top section and a bottom section, said wire insertion means comprising tab openings in outer corners of both said top and bottom sections of said main compartment and said movable expandable compartment, and said tab openings being in alignment when said expandable electrical outlet box is in said closed mode.

2. The outlet box of claim 1 wherein said main compartment and said expandable compartment have locking means to hold them together when in an expanded mode.

3. The outlet box of claim 1 wherein said main compartment comprises means for receiving electrical components outlets including electrical.

4. The outlet box of claim 1 wherein said main compartment has wall connecting means, electrical outlet connecting means and compartment locking means integral therewith.

5. The outlet box of claim 1 wherein said expandable compartment has locking means, said locking means being capable of mating with and locking with a locking means in said main compartment.

6. The outlet box of claim 1 wherein said main compartment has externally positioned wall connecting-adjusting means, said adjusting means used to connect said box to a wall or other supporting structure.

7. The outlet box of claim 1 wherein said main compartment has a gusset ramp positioned at a lower corner, said gusset ramp having means to open an aligned hingable tab cover positioned at a lower corner of said expandable compartment.

* * * * *